Nov. 25, 1952 D. RAGLAND 2,618,978
PRESSURE GAUGE ATTACHING DEVICE FOR PORTABLE SERVICE
Filed Jan. 23, 1951
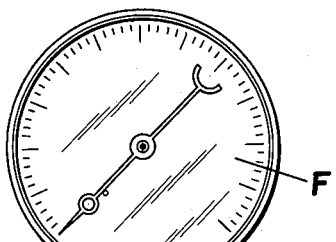
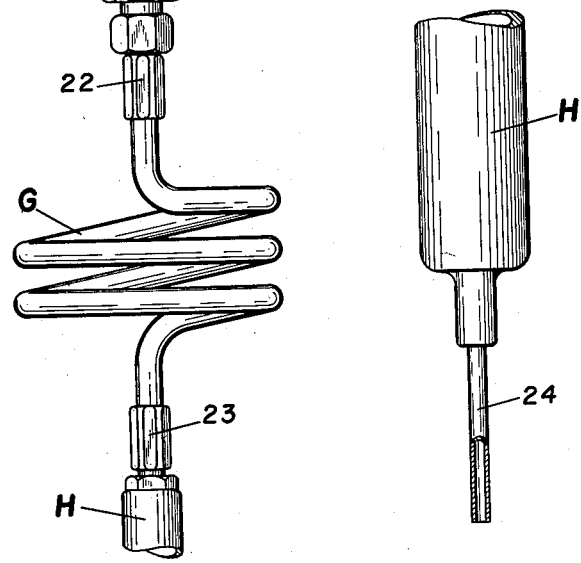
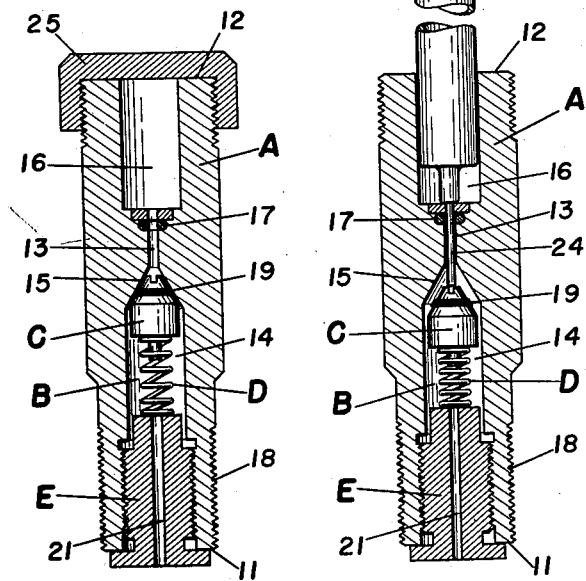
FIG. 1.
FIG. 2.
FIG. 3.
INVENTOR.
Douglas Ragland,
BY
J. G. McKean
ATTORNEY.

Patented Nov. 25, 1952

2,618,978

UNITED STATES PATENT OFFICE 2,618,978

PRESSURE GAUGE ATTACHING DEVICE FOR PORTABLE SERVICE

Douglas Ragland, Houston, Tex., assignor, by mesne assignments, to Standard Oil Development Company, Elizabeth, N. J., a corporation of Delaware Application January 23, 1951, Serial No. 207,370

2 Claims. (Cl. 73—420)

My invention relates to a structure for determining the pressure in closed containers. The structure is particularly suitable for determining the pressure of gas and oil wells.

In the operation of gas and oil fields where the wells are under pressure, it is usual to determine the pressure of the wells at regular intervals. In the usual method for doing this the pressure is read from a pressure gauge which is attached permanently to the Christmas Tree of each well so that the gauge is mounted on the well at all times and exposed to all weather conditions and the normal abuse due to field use. The installation of gauges in this manner represents a considerable investment and, in addition, the installed gauges are often inaccurate and so supply erroneous information.

My invention is directed to a valve structure wherein it is not necessary to attach permanently a pressure gauge to the well, but which at the same time enables an operator or pumper to determine quickly and accurately the well pressure when he so desires. Important advantages of my invention are that the investment in pressure gauges in an oil field may be substantially reduced, that the gauge is not subjected to all weather conditions and to field abuse (since it is not permanently attached to the well head) and that the gauge may be readily calibrated so that it may be expected to give more accurate readings.

Other objects and advantages of this invention may be seen from the following description taken in conjunction with the drawing in which Fig. 1 is an elevation, partly in section, showing an embodiment of the present invention;

Fig. 2 is a fragmentary view showing a part of the device of Fig. 1 in greater detail; and Fig. 3 is a fragmentary view showing another portion of the device of Fig. 1 in greater detail.

Turning now specifically to the drawing, an elongated body A has an axial passage B which extends from end 11 (hereafter designated its first end and is the lower end of body A as shown in the drawing), to end 12 (hereafter designated its second end and is the upper end of body 12 as shown in the drawing). The central part of the passage 13 is of approximately capillary diameter. The first portion of passage B (its lower end as shown in the drawing) designated as 14 is enlarged and a part of the wall of this enlarged front end portion forms a valve seat 15. The second end portion 16 (its upper end as shown in the drawing) of passage B is also enlarged. A sealing ring seat 17 is formed by the body adjacent the central part of the passage 13 and is of capillary dimensions, as is passage 13.

In describing the part 13 of passage B as of approximately capillary diameter, it will be understood that I intend to refer to a passage having a diameter of the same order of magnitude as the diameter of capillary tubing conventionally used in constructing laboratory equipment, namely having a maximum bore of approximately $\frac{1}{16}$ inch and with smaller diameters also suitable for the purpose, as will be readily understood.

The body A is provided with a suitable fastening means adjacent its first end for fastening it to the chamber confining the pressure to be measured. In the embodiment shown, this fastening means is a screw thread 18 formed on the exterior wall of body A.

A valve member C is in the enlarged first end 15 of the central passage and has a sealing ring 19 adapted to seal against the valve seat 15 when valve member C is in its closed position which is its extreme upper position within body A as shown in the drawing. Valve member C is shown in its closed position in Fig. 3. A spring D is mounted in the enlarged first portion 14 of passage B and arranged to bias valve C in its closed position. The first end of the spring (its lower end as shown in the drawing) is held in fixed position by means of bushing E, which is within the enlarged first end 15 of passage B, is secured to the valve body by screw threads 20 and defines an axial passage 21 for the flow of fluid. In the embodiment shown the axial passage 21 has substantially the same diameter as the portion 13 of passage B although it may have a greater or lesser diameter passage as desired.

Pressure gauge F is connected to one end of tubing G through suitable pressure-tight fittings 22. The other end of tubing G is connected to one end of probe H by suitable fittings 23. The free end of probe H terminates in an elongated hollow needle 24 having an exterior diameter slightly less than the diameter of part 13 of passage B. Thus part of its wall in contact with sealing ring 17 makes a fluid-tight seal therewith. When the needle 24 is forced to its extreme downward position within body A, as shown in Fig. 1, it pushes valve member C away from its seat so that it is in its open position and thus allows fluid pressure to be equalized through passage B, probe H, and tubing G to pressure gauge F so that the pressure within the chamber to which body A is attached is registered by pressure gauge F.

The probe H may be readily removed from body

A simply by sliding it upwardly (as shown in the drawing) until it is clear of body A. The probe H is shown separately in Fig. 2. As probe H moves upwardly from the position in which it is shown in Fig. 1, it allows valve member C to move from its open position as shown in Fig. 1 to its closed position as shown in Fig. 3. When the probe is removed from body A it is desirable to close the end of the body A with cap 25 (as shown in Fig. 3) to prevent the entrance of any foreign body within the body A and also to prevent the leakage of fluid through body A if for any reason valve member C should fail to seal or fail to remain sealed against the seat 15 of body A.

It is desirable that the pressure-subject area of valve C in its closed position be of the same order of magnitude as the area of needle 24. By proportioning the parts in this manner the force used by the operator to push valve C from its closed to its open position against the pressure exerted by the gas in the chamber to which body A is attached is of the same order of magnitude as the force required to maintain needle 24 within passage 13 in contact with sealing ring 17 while the pressure within the chamber is being determined. In the embodiment shown the pressure-subject area of the valve is the area bounded by the sealing ring 19 of valve C, which makes the fluid-tight seal when in contact with seat 15. When valve C is closed the force required to push it open will thus be the pressure per unit area exerted by the gas within the chamber to which body A is attached times the area bounded by the sealing surface of ring 19.

It is a particular advantage of the present invention that the area of needle 24 and the sealing area of valve C are kept so small that the device may be mounted on a chamber subject to a large pressure and yet may be readily manipulated manually by an operator. For higher pressures it will usually be desirable to reduce the pressure-subject area of valve C and hollow needle 24 so that the force required to manipulate the device is kept at a value no greater than that which may be readily exerted by an operator. Thus, while I have previously stated that needle 24 should have a maximum diameter no greater than approximately $\frac{1}{16}$ inch, it may on occasions be desirable to reduce its diameter to a substantially lesser amount.

It will be understood that in using the device of the present case commercially in an oil field, it will be practical and desirable to attach a body A to each of the wells in the field. The operator or pumper who gauges the wells may carry with him a single pressure gauge F with attached tubing G and probe H and may determine the pressure of each well in turn. In each case this may be done by removing cap 25 from body A (if a cap 25 is used) and inserting the probe, forcing it in, which causes needle 24 to contact and make a fluid tight seal with sealing ring 17 and then forces valve member C away from its seat 15 so that the pressure of the well will be indicated by pressure gauge F; after taking the reading the probe is removed merely by sliding it out of body A until the needle 24 is clear of the valve body, at which time the cap 25 is replaced. This allows a single testing gauge to be used for gauging a substantial number of wells in the field. In this way a single high-grade testing gauge may be used which permits accurate readings and may be calibrated frequently.

Having fully described and illustrated the preferred embodiment of the present invention, what I desire to claim as new and useful and to secure by Letters Patent is:

1. A testing device for determining the pressure of fluid in a chamber comprising, in combination, an elongated body having fastening means adjacent a first end for fastening the body to a chamber and having an axial passage extending from its first end to its second end with the central part of said passage of approximately capillary diameter and with a sealing ring seat adjacent said part of said passage and the first end portion of said passage enlarged with a part of the wall of said enlarged first end of the passage forming a valve seat, a sealing ring having a central opening slightly smaller than the capillary diameter of said central part of the passage seated in said sealing ring seat, a valve member in the enlarged first end portion of said passage arranged to assume a closed position in contact with said valve seat to seal an area of the same order of magnitude as the capillary part of the passage against fluid flow and movable toward the first end of the body away from said valve seat to an open position, a spring member mounted in said enlarged first portion of the passage with a first end fixed to said body and a second end in contact with said valve member to bias the valve member to its closed position in contact with said valve seat, a pressure gauge, a tubular probe having one end in fluid communication with said pressure gauge and its free end terminating in an elongated tubular portion arranged within the axial passage of said body with a portion of its outer wall in contact with and making a fluid-tight seal with said sealing ring, said elongated end portion being slidable within said central part of the passage and capable of forcing the valve member toward the first end of the body away from its seat.

2. A device in accordance with claim 1 in which the first end of said spring is supported by a bushing mounted in the enlarged first end portion of the passage of said elongated body and secured thereto by screw threads with the bushing having an axial central passage with a diameter of the same order of magnitude as said central part of the axial passage.

DOUGLAS RAGLAND.

REFERENCES CITED

The following references are of record in the file of this patent:

UNITED STATES PATENTS

| Number | Name | Date |
|---|---|---|
| 1,540,241 | Beachler | June 2, 1925 |
| 2,320,456 | Frazer-Nash | June 1, 1943 |
| 2,459,477 | Van Schuyver | Jan. 18, 1949 |

FOREIGN PATENTS

| Number | Country | Date |
|---|---|---|
| 501,851 | Germany | July 5, 1930 |
| 541,759 | Germany | Jan. 15, 1932 |